UNITED STATES PATENT OFFICE.

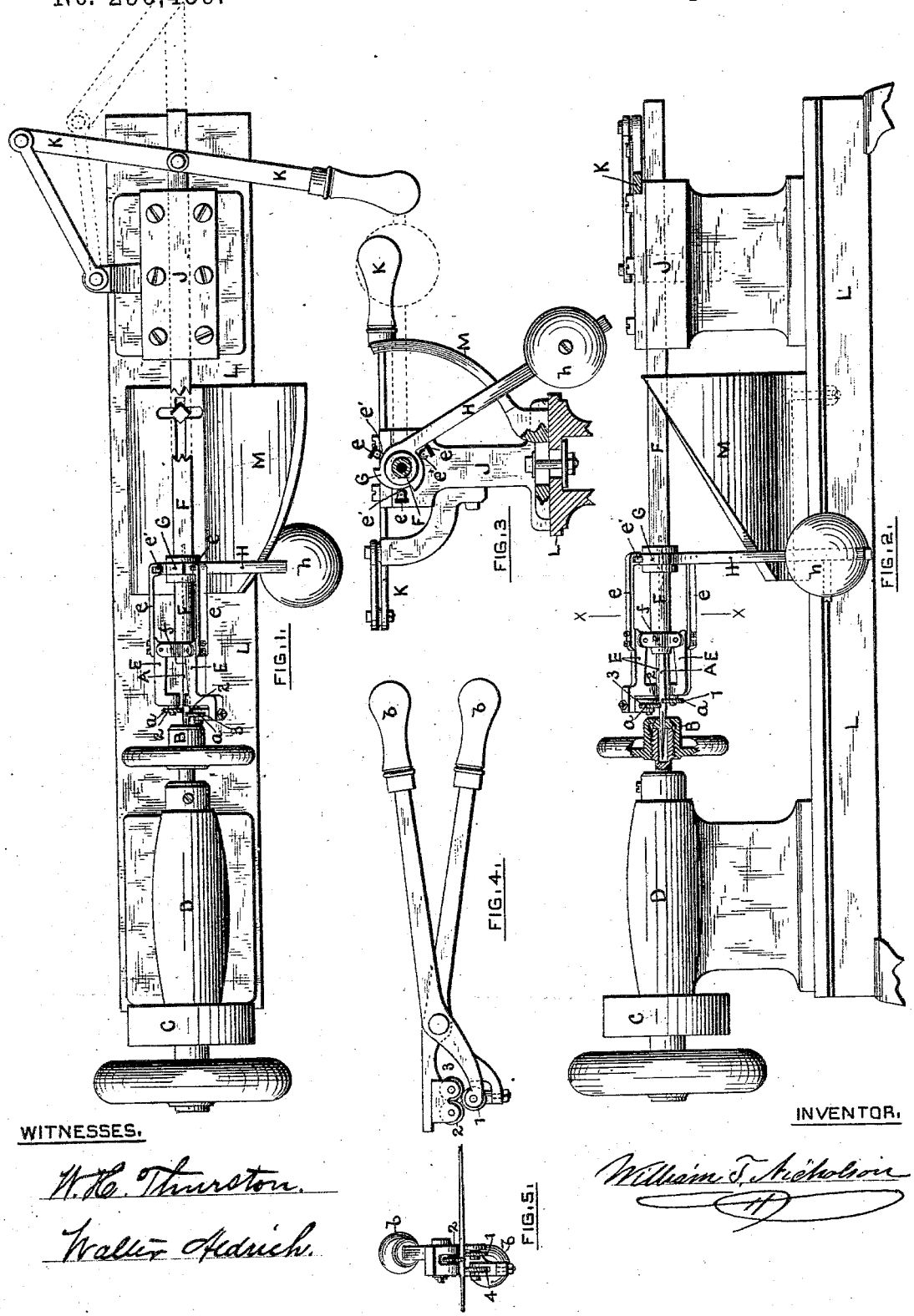

WILLIAM T. NICHOLSON, OF PROVIDENCE, RHODE ISLAND.

MACHINE FOR FORMING TEETH UPON FILE-BLANKS.

SPECIFICATION forming part of Letters Patent No. 296,439, dated April 8, 1884.

Application filed May 28, 1883. (No model.)

*To all whom it may concern:*

Be it known that I, WILLIAM T. NICHOLSON, of the city and county of Providence, and State of Rhode Island, have invented a new and useful Improvement in Machines for Forming Teeth Upon File-Blanks; and I do hereby declare that the following specification, taken in connection with the accompanying drawings, forming a part of the same, is a full, clear, and exact description thereof.

This invention has reference to an improved means for forming the teeth upon file-blanks which are circular in cross-section, but which may taper from heel to point; and it consists in the means hereinafter set forth, whereby the general method of forming teeth upon file-blanks described in the Letters Patent granted to me May 22, 1883, and numbered 278,169, can be practiced upon blanks which rotate on their axes while the teeth are being formed thereon, or which are stationary, and the tooth-generating tool or tools are made to revolve around the blank.

Referring to the drawings, Figure 1 represents in plan a machine embodying the invention. Fig. 2 shows the same in side elevation. Fig. 3 represents a vertical transverse section on line X X. Figs. 4 and 5 show, respectively, side and end views of a hand-tool adapted for use upon a revolving blank.

The blank A is securely held by its tang in a suitable chuck, B, which is made to revolve by a driving-pulley, C, and a belt in the usual manner in which the spindle of a common lathe is rotated in its head-stock.

D is a suitable bed or frame, upon which the head-stock and other parts, hereinafter to be referred to, are mounted.

The generator by which the teeth can be formed on the blank is shown at Figs. 4 and 5, and consists of a series of small hardened-steel cylinders, *a*, which are capable of revolving freely on axles, as clearly shown in the drawings. Each of such cylinders is provided with teeth, the cutting-edges of which may be parallel with the axis of revolution of the cylinder, or may be oblique thereto, but must not be at right angles therewith. The salient faces of the teeth on the cylinders correspond generally in form with the depressions or spaces between the teeth to be formed on the file-blank, and their depressed portions or interspaces approximate in form to the figure which the teeth on the file are to have. One of these generating-tools, however, and that one which travels last over the surface of the blank in the track made by the other tools in the series, has the teeth upon its periphery set at a slightly-different angle to the axis of the file-blank than the teeth of the other tools in the series; or the tool itself is so mounted that it can be adjusted to a different angle, in order to produce a shearing-cut to sharpen the edges of the teeth already molded or formed by the preceding generating-tools in the series.

At Figs. 4 and 5 a hand-tool is shown, in which there are mounted four generators of the character above described. At Fig. 4 generators numbered 1, 2, and 3, are seen, but No. 4 is concealed, being behind No. 1. At Fig. 5 generators 1, 2, and 4, are seen, No. 3 being concealed behind No. 2. When this hand-tool is used the necessary force to cause the teeth to be molded and formed upon the blank by the generators is obtained by pressing the handles *b b* toward each other in a manner obvious from an inspection of the drawings, and this, as well as the movement of the tool in the direction of the longitudinal axis of the file-blank, is performed by the operator.

In operation, the handles of the tool are separated, which enables the generators to be placed in proper position upon the blank at its butt, and close to the face of the holding-chuck. The handles are then pressed toward each other with sufficient force to enable the teeth of the hardened-steel generators to press into the soft annealed blank, and at the same time a steady lateral pressure is applied sufficient to move the tool in a direction parallel with the axis of the blank. In this instance the finishing-generator, or that one which produces the shear-cut, is the one designated by the number 4 in Fig. 5, and it is shown so mounted as to be capable of an adjustment which will cause the axis upon which it revolves to be thrown out of parallelism with the axes of the other generators. It follows that the generators numbered 1, 2, and 3 will precede the generator numbered 4, and the teeth on the blank formed by them will necessarily be sharpened or finished, so as to be provided with cutting-edges, on the principle described in my said Letters Patent hereinbefore referred to. To facilitate the action of this series of generators numbered 1, 2, and 3, the first in the series may make a shallow cut or rudimentary tooth in the blank, and the others following in sequence may progressively complete it to its full size, while the finishing-generator will perfect the cutting-edge.

At Figs. 1, 2, and 3 there is shown a machine in which a tooth-generator of the character hereinbefore described can be used, and the pressure to be exerted upon the blank necessary for forming the teeth is automatically applied. The tooth-generators $a\ a\ a$, which in these figures are three in number, and are also designated as 1, 2, and 3, are severally mounted on axles which project from the bent ends of levers E E E. These levers have their fulcra in a collar, $f$, forming a part of a bar, F, and are arranged in a circle around the bar equidistant from each other. The rearward portions $e$ of the levers E are preferably formed of spring-steel, and small friction-rollers $e'$ are placed in their extremities and take a bearing upon the three-faced cam G, formed on the hub of a weighted arm, H. The effect of moving the weighted arm upward in the arc of a circle will necessarily be to cause the three faces of the cam G to act upon the levers E and compel the generators to approach nearer to each other. The bar F is made hollow for a certain distance, so that the file-blank can enter therein, and it extends rearwardly through guides made in a standard or tail-stock, J, and a to-and-fro movement can be easily given to this bar by means of a hand-lever, K, arranged, as plainly shown at Fig. 1; or in place of the means for working the bar F by hand any convenient feeding device for giving a regular progressive movement to the bar can be substituted.

In order to regulate the degree of pressure which shall be exerted by the tooth-generators upon the file-blank, there is mounted upon the bed-plate L of the machine a block or pattern, M, the top edge of which is inclined generally, as shown in the figure. Upon this inclined edge or face the arm H rests, and is held in contact therewith by the weight $h$. The contour of the face of the block M corresponds with the outline of the file-blank, and the movement of the arm H over such face in the operation of moving rearward the bar F, with the generators and the said weighted arm attached thereto, will cause the generators to act upon the file-blank for the purpose of forming teeth thereon with a degree of force determined by the contour of such face, and conformable to the requirements of the varying cross-sections of the file-blank from heel to point. This pattern-block should be arranged so as to be adjustable in position upon the bed, and its attachment should be such as to admit of its removal for the substitution of one of a different pattern.

The operation of the machine may be understood from an inspection of Fig. 2. The axis of the file-blank, after it has been secured in the revolving chuck B, will coincide with the hollow axis of the bar F, to which the series of generators $a\ a\ a$ are attached, and such bar, when it has been moved to the position indicated in the figure, will allow the generators to rest upon the blank close to the face of the holding-chuck. The arm H being at its lowest position, as shown at Figs. 2 and 3, the generators will be at their farthest distance apart from each other. Now, when the operator, by applying force to the hand-lever K, causes the bar F to be moved rearwardly, the weighted arm H will be drawn over the upwardly-inclined face of the block M, and consequently the generators will be made to approach radially toward each other to an extent such as the contour of the face of the block M induces, modified in its action by the shape of the three faces of the cam G.

The action of the generators in forming the teeth upon the file-blank is the same as previously described; the last one in the series, by reason of the fact that it is set to revolve in planes which are oblique to the planes in which the file-blank revolves, causes the teeth raised on the blank by the preceding generators to be sharpened suitably for the cutting-teeth of files.

While I prefer to use a series of generators which will surround the file-blank and give support to it and mutually resist the pressure of each other upon the blank to prevent springing or bending it, and while I also prefer that the generators should act progressively to throw up or form the file-teeth, and that the last one in the series should be set to revolve in planes more oblique to the planes in which the blank revolves than any of its predecessors in the series, my invention will be employed in case a single tooth-generating wheel, the teeth of which are parallel with the axis of revolution of such single tooth-generating wheel or oblique thereto, but not at right angles therewith, be made to press against the surface of the revolving file-blank, and be made to traverse the blank in the direction of the length of the blank, provided always that the vertical planes in which such generator revolves are oblique to the vertical planes in which the file-blank revolves, whereby, as the result of such arrangement, the cutting-edges of the teeth are made less epicycloidal in form and sharper than they would be if they were formed by a generator of the same character, but the axis of revolution of which was parallel to the axis of the file-blank.

It is obvious, also, that an essential part of my invention will be employed, so far as the formation of teeth on the blank is concerned, if the file-blank is held stationary while the tooth-generating tool is made to revolve around it, as can easily be done in case cylindrical blanks, or those which have a very slight taper from heel to point, are to be cut, in which case no provision is necessary for making the generators approach each other radially to suit a decrease in the diameter of the blank beyond what would be accomplished by mounting the jaws which hold the generators upon yielding spiral or other springs, and locating them in a head which is made to revolve by means of a pulley and belt, while the file-blank is relatively at rest. It also involves no change of principle if the machine is so constructed that the blank is made to move in the direction of its length during the tooth-forming operation, instead of having the tooth-generating tool travel along the length of the blank.

What I claim as my invention, and desire to secure by Letters Patent, is—

1. The combination, substantially as before set forth, of a clamp or suitable holder for a file-blank, a revolving tooth-generating cylinder, substantially as described, and arranged relatively to the file-blank, so that the axis upon which it revolves shall be oblique to the longitudinal axis of the blank, suitable means, as described, for causing either the file-blank to be rotated upon its axis or the generator to be revolved upon the blank, and suitable means, as described, for causing pressure to be exerted by the generator upon the blank, to form cutting-teeth thereon, as set forth.

2. The combination, substantially as before set forth, of a clamp or suitable holder for a file-blank, a series of revolving tooth-generating cylinders, substantially as described, the last one of such cylinders in the series having its teeth arranged at a greater obliquity to the axis of the cylinder than the teeth of the preceding generators in the series, suitable means, as described, for causing either the file-blank to be rotated on its axis or the generator to be revolved around the blank, and suitable means, as described, for causing pressure to be exerted by the generator upon the blank, to form cutting-teeth thereon, as set forth.

3. The combination, substantially as before set forth, of a clamp or suitable holder for a file-blank, a series of tooth-generating cylinders, substantially as described, the last one of such generators in the series being arranged, as described, relative to the file-blank, so that the axis upon which it revolves shall be oblique to the longitudinal axis of the blank, suitable means, as described, for rotating the blank upon its axis, suitable means, as described, for giving a movement to the tooth-generating tool lengthwise of the blank, and a pattern-face conforming to the shape of the file-blank, whereby the generating-tool can be made to press upon a tapering file-blank throughout its length.

4. The combination, substantially as before set forth, of a clamp or suitable holder for a file-blank, a series of tooth-generating cylinders mounted in the ends of levers, as described, and pivoted to a sliding bar, the axis of which coincides with the axis of the blank-holder, means, as described, for giving a to-and-fro movement to said bar, means, as described, for causing the generators to approach radially toward each other to conform to the taper of the blank, and means, as described, for rotating the blank upon its axis.

WILLIAM T. NICHOLSON.

Witnesses:
W. H. THURSTON,
WALTER ALDRICH.